us009964136B2

United States Patent
Nam et al.

(10) Patent No.: US 9,964,136 B2
(45) Date of Patent: May 8, 2018

(54) MOUNTING BOLT FOR SUB-FRAME

(71) Applicant: SUNGWOO HITECH CO., LTD., Busan (KR)

(72) Inventors: Kisung Nam, Busan (KR); Jeong Jae Hwang, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days. days.

(21) Appl. No.: 15/132,343

(22) Filed: Apr. 19, 2016

(65) Prior Publication Data

US 2017/0008564 A1    Jan. 12, 2017

(30) Foreign Application Priority Data

Jul. 7, 2015 (KR) .................. 10-2015-0096271
Dec. 11, 2015 (KR) .................. 10-2015-0176768

(51) Int. Cl.
*F16B 35/00* (2006.01)
*F16B 23/00* (2006.01)
*F16B 35/06* (2006.01)

(52) U.S. Cl.
CPC .............. *F16B 35/00* (2013.01); *F16B 23/00* (2013.01); *F16B 35/06* (2013.01)

(58) Field of Classification Search
CPC ...... F16B 23/00; F16B 23/0007; F16B 35/00; F16B 35/06
USPC ................................ 411/383, 396, 402, 408
See application file for complete search history.

(56) References Cited

U.S. PATENT DOCUMENTS

| | | | | |
|---|---|---|---|---|
| 2,713,186 A * | 7/1955 | Borowsky | ............... | F16B 5/125 24/291 |
| 3,187,796 A * | 6/1965 | Double | ................. | F16B 37/068 411/179 |
| 3,245,449 A * | 4/1966 | Mitchell | ................. | F16B 35/06 411/176 |
| 3,467,417 A * | 9/1969 | Whiteside | ............... | F16B 35/06 403/408.1 |
| 3,529,508 A * | 9/1970 | Cooksey | .................. | A47G 3/00 411/374 |
| 3,829,957 A * | 8/1974 | Pouch | .................... | F16B 37/068 29/445 |
| 3,878,599 A * | 4/1975 | Ladouceur | ............. | B21D 51/40 29/432.2 |

(Continued)

FOREIGN PATENT DOCUMENTS

JP        11351224        12/1999
JP        2001-248621     9/2001

(Continued)

*Primary Examiner* — Roberta S Delisle
(74) *Attorney, Agent, or Firm* — Lex IP Meister, PLLC

(57) ABSTRACT

A mounting bolt for a sub-frame is disclosed. A mounting bolt for a sub-frame that is configured to a sub-frame to a front side member of a vehicle according to one or a plurality of exemplary embodiments of the present invention may include a bolt body that is inserted into a through-hole of a mounting bracket that is fixed to the front side member and joined to the mounting bracket through a head portion, and a support body that has a cylindrical shape, is friction-welded to a center of an upper surface of a head portion of the bolt body along one line, and of which an upper end is joined to the front side member.

9 Claims, 7 Drawing Sheets

(56) References Cited

U.S. PATENT DOCUMENTS

| | | | | | |
|---|---|---|---|---|---|
| 3,926,236 | A | * | 12/1975 | Pouch .................. | B23P 19/062 |
| | | | | | 411/179 |
| 4,459,073 | A | * | 7/1984 | Muller .................. | B23P 19/062 |
| | | | | | 29/243.519 |
| 4,850,772 | A | * | 7/1989 | Jenkins .............. | B23K 35/0288 |
| | | | | | 228/2.3 |
| 5,382,125 | A | * | 1/1995 | Durr .................... | A61B 17/685 |
| | | | | | 411/383 |

FOREIGN PATENT DOCUMENTS

| | | |
|---|---|---|
| KR | 10-2005-0014280 | 2/2005 |
| KR | 10-2005-0014281 | 2/2005 |
| KR | 10-1459614 | 11/2014 |
| WO | 2002042144 | 5/2002 |

* cited by examiner

MOUNTING BOLT FOR SUB-FRAME

CROSS-REFERENCE TO RELATED APPLICATION

This application claims priority to and the benefit of Korean Patent Application No. 10-2015-0096271 and 10-2015-0176768 filed in the Korean Intellectual Property Office on Jul. 7, 2015 and December 11, the entire contents of which are incorporated herein by reference.

BACKGROUND OF THE INVENTION (a) Field of the Invention

The present invention relates to a mounting bolt for a sub-frame. More particularly, the present invention relates to a mounting bolt for a sub-frame that reduces cost and weight and maintains robustness thereof.

(b) Description of the Related Art

Generally, in a monocoque vehicle body, a sub-frame is assembled to a lower portion of a front side member to support a lower portion of an engine (not shown) and a transmission (not shown) and induces the engine and the transmission to drop when a front end of a vehicle crashes, and prevents the engine or the transmission from entering an inner space through a dash panel of a vehicle body to secure safety of a passenger.

FIG. 1 is a perspective view for describing a sub-frame that is assembled to a lower portion of a front side member for a conventional vehicle, and FIG. 2 is a perspective view showing a condition in which a mounting bolt for a sub-frame is applied according to a conventional art.

Referring to FIG. 1, both sides of a front and a rear of the sub-frame 101 are assembled by a mounting unit 100 for a frame (hereinafter, a mounting unit) that is configured at a lower portion of both sides of a front side member 103.

Referring to FIG. 2, the mounting unit 100 includes a mounting bolt 110 that is fixed to both sides of a front side and a rear side of the front side member 103 through a mounting bracket 105, and both sides of a front side and a rear side of the sub-frame 101 are assembled to the mounting bolt 110.

That is, the mounting bracket 105 is joined to a lower portion of both sides of a front and a rear of the front side member 103, and the mounting bolt 10 is joined by CO2 welding or projection welding in a condition in which it is inserted into a through-hole 107 formed on a mounting bracket 105.

Here, the mounting bolt 10 is integrally formed by cold forging or hot forging, and is welded in a condition in which it is supported by a circumference of the through-hole 107 of the mounting bracket 105 by a head portion 111 that is formed along one side circumference.

The mounting bolt 10 that is configured as described above is one of components of a vehicle, but there is a drawback that the weight is unnecessarily heavy, because it is integrally formed by cold forging or hot forging, which increases cost.

The Description of the Related Art is given to help understanding of the background of the present invention and may include matters out of the related art known to those skilled in the art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mounting bolt for a sub-frame having advantages of reducing weight and cost of a component by applying a hollow space to a cylindrical support body that is connected to a front side member.

A mounting bolt for a sub-frame that is configured to a sub-frame to a front side member of a vehicle according to one or a plurality of exemplary embodiments of the present invention may include a bolt body that is inserted into a through-hole of a mounting bracket that is fixed to the front side member and joined to the mounting bracket through a head portion, and a support body that has a cylindrical shape, is friction-welded to a center of an upper surface of a head portion of the bolt body along one line, and of which an upper end is joined to the front side member.

The support body may be friction-welded to be joined in a condition in which a front end thereof is inserted into a groove that is formed at a center of an upper surface of the head portion.

The support body may be friction-welded to the head portion in a condition in which a front end thereof is inserted into a protruded portion that is formed at a center of an upper surface of the head portion.

The head portion may have an insertion groove into which a front end of the support body is inserted at a circumference of the protruded portion.

The support body may be friction-welded to be joined in a condition in which a front end thereof is inserted into the insertion groove.

The bolt body may be joined by CO2 welding or projection welding to the mounting bracket through the head portion.

The bolt body and the support body may be formed by cold forging.

An outside wall may be formed along a circumference of the head portion, an undercut groove may be formed along an inner circumference of the outside wall, and a front end portion of the support body may be inserted into a center portion of the outside wall and is friction-stir welded on the head portion of the bolt body.

An end portion of the support body may be partially melted by friction-stir welding to be joined to a head portion of the bolt body, and a welding bead flows into the undercut groove to be fixed thereto.

A protruded portion may be formed at an upper center of the head portion, an undercut groove may be formed along an exterior circumference of the protruded portion, and a front end portion of the support body may be inserted into the protruded portion to be friction-stir welded.

An end portion of the support body may be partially melted by friction-stir welding to be fixed at an undercut groove of a head portion of the bolt body, and simultaneously a welding bead may fill the undercut groove to be fixed therein.

An insertion groove, into which a front end portion of the support body is inserted, may be formed in the head portion, an undercut groove may be formed in the insertion groove in a radial direction, and a front end portion of the support body may be inserted into the insertion groove and may be friction-stir welded on a head portion of the bolt body.

An end portion of the support body may be partially melted by friction-stir welding in an undercut groove that is formed on a head portion of the bolt body, and a welding bead may fill the undercut groove to be fixed thereto.

A mounting bolt for a sub-frame that is used to engage a sub-frame to a front side member of a vehicle according to an exemplary embodiment of the present invention may include a bolt body that is inserted into a penetration hole of a mounting bracket that is fixed on the front side member and is joined to the mounting bracket through a head portion, and a support body that is formed with a cylindrical shape to be joined to the front side member, wherein an end portion of the support body is partially melted by friction-stir welding in an undercut groove that is formed in a head portion of the bolt body, and a welding bead is simultaneously formed to be solidified therein such that the bolt body and the support body are joined.

The undercut groove may be formed along an interior circumference of an outside wall that is formed along an exterior circumference of the flange portion.

The undercut groove may be formed in the head portion along an exterior circumference of a protruded portion that is formed at an upper center of the head portion.

The undercut groove may be formed at an inner side and an outer side of the support body in an insertion groove that is formed in the head portion.

In an exemplary embodiment of the present invention, a bolt body that is inserted into a through-hole of a mounting bracket to be joined through a head portion and a cylindrical support body that is joined to the head portion of the bolt body are applied, and thus there are effects that the weight is reduced, robustness is maintained, and cost is saved.

Further, effects that can be obtained or that are predicted with an exemplary embodiment of the present invention are directly or suggestively described in a detailed description of an exemplary embodiment of the present invention. That is, various effects that are predicted according to an exemplary embodiment of the present invention will be described within a detailed description to be given later.

DETAILED DESCRIPTION OF THE EMBODIMENTS

Hereinafter, an exemplary embodiment of the present invention will be described with reference to accompanying drawings.

Figure 1:
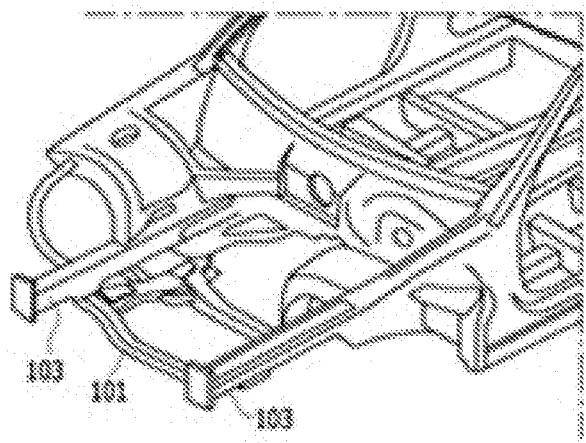
FIG. 1 is a perspective view for describing a sub-frame that is assembled to a lower portion of a front side member for a conventional vehicle.
Figure 2:
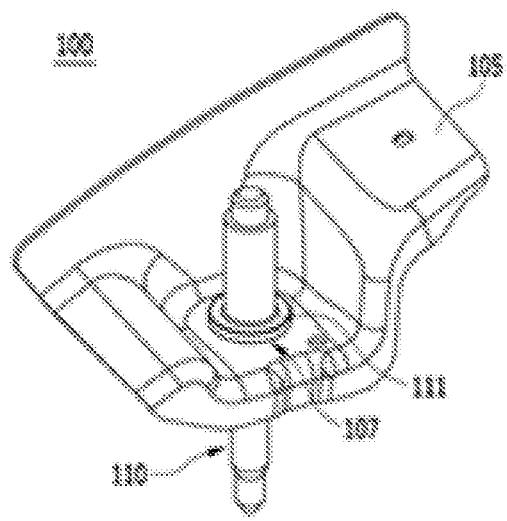
FIG. 2 is a perspective view showing a condition in which a mounting bolt for a sub-frame is applied according to a conventional art.
Figure 3:
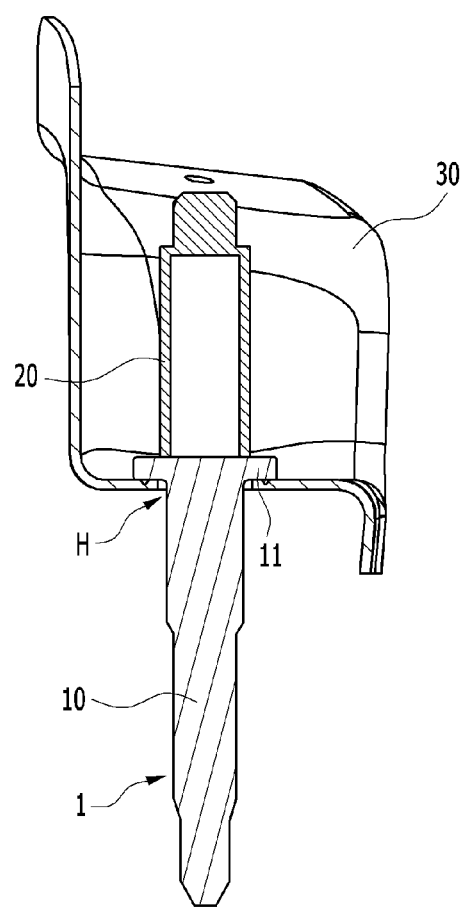
FIG. 3 is a cross-sectional view showing a condition in which a mounting bolt is applied according to an exemplary embodiment of the present invention.
Figure 4:
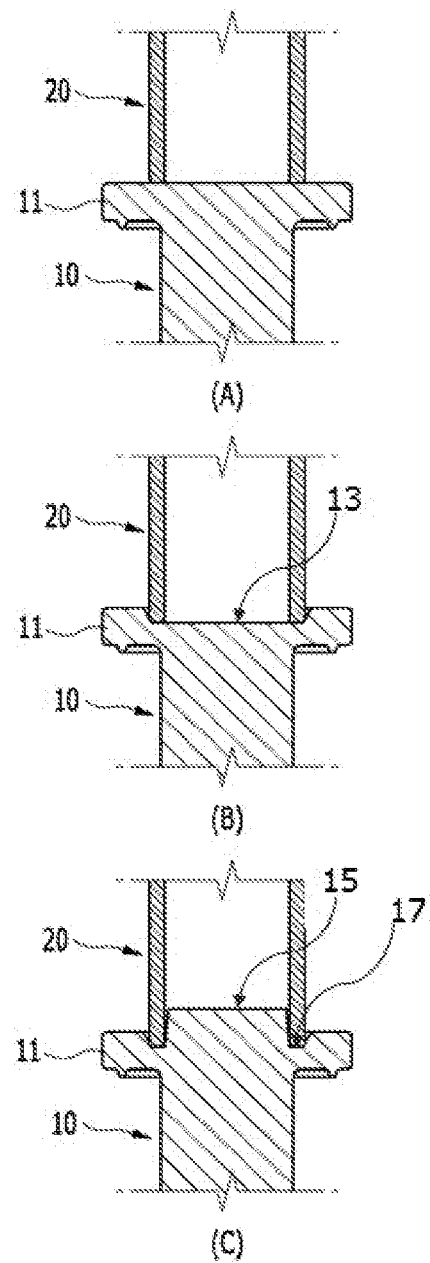
FIG. 4 is an illustration showing a condition in which a bolt body and a support body are combined with each other according to an exemplary embodiment of the present invention.

FIG. 3 is a cross-sectional view showing a condition in which a mounting bolt is applied according to an exemplary embodiment of the present invention, and FIG. 4 is an illustration showing a condition in which a bolt body and a support body are combined with each other according to an exemplary embodiment of the present invention.

Referring to FIG. 3, a mounting unit for a sub-frame to which a mounting bolt 1 is applied according to an exemplary embodiment of the present invention is for engaging a sub-frame to a front side member of a vehicle and has a function of reducing damage to a passenger by guiding an engine or a transmission, which are assembled together, to a lower portion of a vehicle body when a front end of a vehicle crashes.

The mounting bolt 1 that is applied to the mounting unit for a sub-frame according to an exemplary embodiment of the present invention is generally fixed to a lower portion of a front side member through a mounting bracket 30 and is divided into a bolt body 10 and a support body 20.

The bolt body 10 has a head portion 11 that is integrally formed with an upper end thereof, is inserted into a through-hole (H) of the mounting bracket 30 from an upper side, and is joined to the mounting bracket in a condition in which the head portion 11 is supported by a circumference of the through-hole (H).

That is, the head portion 11 has a larger diameter than that of the through-hole (H), and is joined to the circumference of the through-hole (H) of the mounting bracket 30 by CO2 welding or projection welding.

Further, the support body 20 has a cylindrical shape with a hollow space therein, a lower end thereof is joined to the head portion 11 to form a straight line with the bolt body 10, and an upper end thereof is fixed to a front side member.

The support body 20 can be formed with a cylindrical shape by cold forging, but it is not limited thereto, and any method can be applied to form the support body 20 as long as strength and physical properties of the material satisfy rigidity when it is joined to the bolt body 10.

Hereinafter, referring to FIG. 4, three cases of joining methods of the bolt body 10 and the support body 20 will be described.

Firstly, referring to FIG. 4 (A), in a case 1, a lower end of the support body 20 is disposed on a center of an upper surface of the head portion 11 to form a straight line and is welded through rotation friction stirring.

Referring to FIG. 4 (B), in a case 2, a groove 13 with a predetermined depth of is formed at a center of an upper surface of the head portion 11, and a lower end of the support body 20 is inserted into the groove to be welded by rotation friction stirring, that is, friction welding.

Herein, the bolt body 10 and the support body 20 are disposed along a straight line to maintain a straight structure.

Referring to FIG. 4 (C), in a case 3, an insertion groove 17 with a predetermined depth is formed on a circumference of an upper surface center of the head portion 11, and a protruded portion 15 that protrudes upwardly is formed at an inner side of the insertion groove 17.

In a condition in which a lower end of the support body 20 is inserted into the insertion groove 17 of the head portion 11, they are welded by rotation friction stirring (friction welding).

In this case, the protruded portion 15 is inserted into an inner side of a lower end portion of the support body 10, maintains the straightness of the bolt body 10 and the support body 20, and improves assembly stiffness.

Here, the bolt body 10 and the support body 20 are welded by friction stirring, but it is not limited thereto, and any methods can be applied thereto as long as the bolt body 10 and the support body 20 are strongly joined.

Accordingly, in a mounting bolt 1 for a sub-frame according to an exemplary embodiment of the present invention as described above, the bolt body 10 and the support body 20 are separately formed by cold forging, they are joined by butt-welding, and the support body 20 is formed to have a cylindrical hollow space body such that weight is reduced, strength is secured, and cost can be saved, compared to a conventional embodiment.

Figure 5:
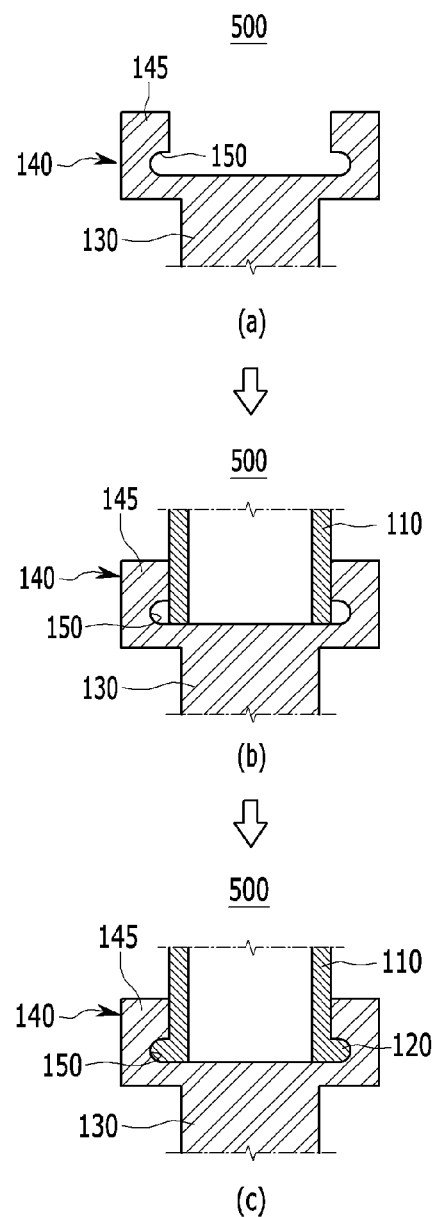
FIG. 5 is a cross-sectional view showing a friction welding portion according to an exemplary embodiment of the present invention.

FIG. 5 is a cross-sectional view showing a friction welding portion according to an exemplary embodiment of the present invention.

Referring to FIG. 5, in a friction welding portion 500, an end portion of a support body 110 is friction-stir welded to a first undercut groove 150 of an outside wall 145 that is formed on a head portion 140, and a bolt body 130 is joined to the support body 110.

That is, as shown in (a) of FIG. 5, the friction welding portion 500 forms the outside wall 145 along a circumference of the head portion 140 of the bolt body 130 and forms the first undercut groove 150 in the outside wall 145 along a lower end circumference thereof.

Further, as shown in (b) of FIG. 5, a lower end portion of the support body 110 is inserted into an inside of the outside wall 145. Next, as shown in (c) of FIG. 5, a lower end portion of the support body 110 is partially melted by friction-stir welding, a first welding bead 120 flows into the first undercut groove 150 to be fixed therein, and simultaneously the first welding bead 120 is joined to the head portion 140 of the bolt body 130.

Figure 6:
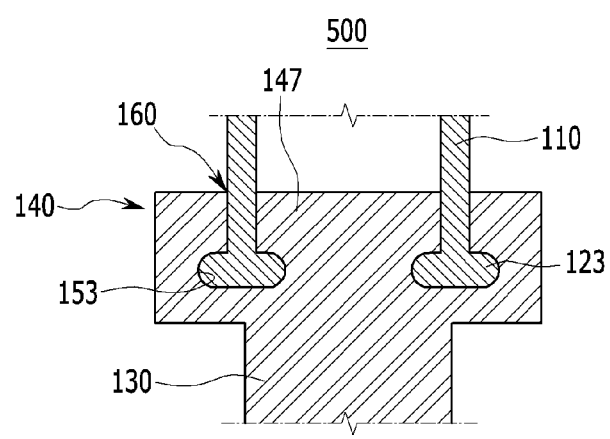
FIG. 6 is a cross-sectional view showing a friction welding portion according to another exemplary embodiment of the present invention.

FIG. 6 is a cross-sectional view showing a friction welding portion according to another exemplary embodiment of the present invention.

Referring to FIG. 6, a friction welding portion 500 forms an insertion groove 160 into which a lower end portion of the support body 110 is inserted in a head portion 140. The insertion groove 160 has the same shape as the support body 110. That is, the insertion groove 160 may have a cylinder shape. An interior diameter of the insertion groove 160 may be larger than an interior diameter of the support body 110.

The friction welding portion 500 has a second undercut groove 153 that is formed in the insertion groove 160 in a radial direction.

Further, a lower end portion of the support body 110 is inserted into the insertion groove 160 and is friction-stir welded. That is, the support body 110 is partially melded by friction-stir welding, a second welding bead 123 flows into the second undercut groove 153 to be fixed thereto, and the bead 123 is simultaneously joined to the head portion 140 of a bolt body 130. The second welding bead 123 may be formed at both sides of a lower end portion of the support body 110 along the second undercut groove 153.

Figure 7:
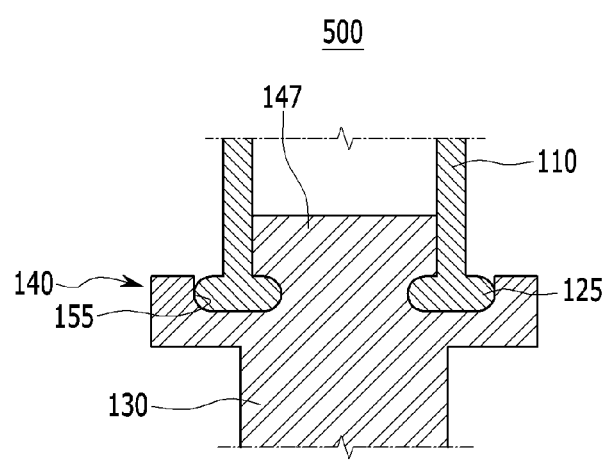
FIG. 7 is a cross-sectional view showing a friction welding portion according to another exemplary embodiment of the present invention.

FIG. 7 is a cross-sectional view showing a friction welding portion according to another exemplary embodiment of the present invention.

Referring to FIG. 7, a friction welding portion 500 has a protruded portion 147 that is formed at an upper center of a head portion 140. In this condition, the protruded portion is inserted into a lower end portion of a support body 110, can maintain straightness of a bolt body 130 and the support body 110, and can improve assembly reliability.

The friction welding portion 500 has a third undercut groove 155 that is formed in the head portion 140 along an exterior circumference of the protruded portion 147.

Further, a lower end portion of the support body 110 is inserted into the third undercut groove 155 that is formed on the head portion 140 of the bolt body 130, and is friction-stir welded. That is, a lower end portion of the support body 110 is partially melted by friction-stir welding, and a third welding bead 125 flows into the third undercut groove 155, and is simultaneously joined to the head portion 140 of the bolt body 130.

Accordingly, in a mounting bolt for a sub-frame according to the present invention as described above, a lower end portion of the support body 110 is partially melted by friction-stir welding and flows into the undercut groove 155 of the friction welding portion 500 to form a welding bead such that the support body 110 and the bolt body 130 are joined, and thus the support body 110 and the bolt body 130 can be firmly joined together.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1 . . . mounting bolt for a sub-frame
10, 130 . . . bolt body
11, 140 . . . head portion
13 . . . groove
15, 147 . . . protruded portion
17 . . . insertion groove
20, 110 . . . support body
30 . . . mounting bracket
H . . . penetration hole
500: friction welding portion
145: outside wall
150, 153, 155 . . . first, second, third undercut grooves
120, 123, 125 . . . first, second, third welding beads
160: insertion groove

What is claimed is:

1. A mounting bolt for engaging a sub-frame to a front side member of a vehicle, comprising:
a bolt body that is inserted into a through-hole of a mounting bracket fixed on the front side member and is joined to the mounting bracket through a head portion that is integrally formed at an upper end thereof; and
a support body that has a cylindrical shape with a hollow space therein, of which a lower end is joined to an upper surface of the head portion so that a center of the support body and a center of the bolt body are aligned, and of which an upper end is joined to the front side member,
wherein the head portion includes an insertion groove with a predetermined depth formed on the upper surface thereof, and a protruded portion that protrudes upwardly and is formed at an inside of the insertion groove, and
wherein the lower end of the support body is inserted into the insertion groove and the protruded portion is inserted into the hollow space of the support body.

2. The mounting bolt of claim 1, wherein
the support body is friction-welded to the bolt body.

3. The mounting bolt of claim 1, wherein
the bolt body is joined by CO2 welding or projection welding of the head portion to the mounting bracket.

4. The mounting bolt of claim 1, wherein
the bolt body and the support body are formed by cold forging.

5. The mounting bolt for a sub-frame of claim 1, wherein an undercut groove is formed at a lower end of the insertion groove and along an exterior circumference of the protruded portion in a radial direction, and the lower end of the support body is inserted into the insertion groove and an end portion of the lower end of the support body is inserted into the undercut groove.

6. The mounting bolt of claim 5, wherein
the end portion of the lower end of the support body is partially melted by friction-stir welding and a welding bead formed by friction-stir welding fills the undercut groove to be fixed thereto.

7. A mounting bolt for engaging a sub-frame to a front side member of a vehicle, comprising:
a bolt body that is inserted into a through-hole of a mounting bracket fixed on the front side member and is joined to the mounting bracket through a head portion that is integrally formed at an upper end thereof; and
a support body that has a cylindrical shape with a hollow space therein joined to the front side member,
wherein the head portion includes an insertion groove with a predetermined depth formed on an upper surface thereof and a undercut groove formed at a lower end of the insertion groove, and
wherein a lower end of the support body is inserted into the insertion groove and an end portion of the lower end of the support body is inserted into the undercut groove.

8. The mounting bolt for a sub-frame of claim 7, wherein
the end portion of the lower end of the support body is partially melted by friction-stir welding to be joined to a head portion of the bolt body, and a welding bead formed by friction-stir welding flows into the undercut groove to be fixed thereto.

9. The mounting bolt of claim 7, wherein
the insertion groove is of a ring shape and the undercut groove is formed in a radial direction at the lower end of the insertion groove.

* * * * *